No. 701,619. Patented June 3, 1902.
P. RIECKE.
GAS WASHER.
(Application filed Nov. 4, 1901.)
(No Model.)
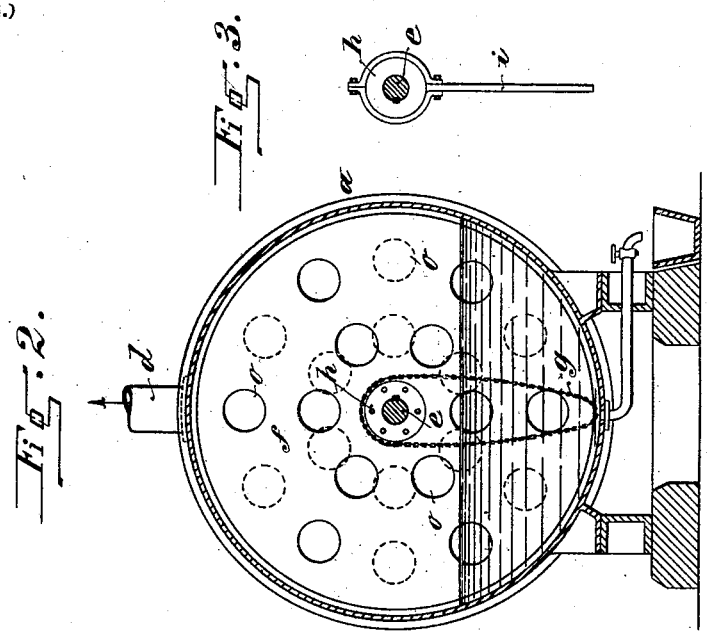
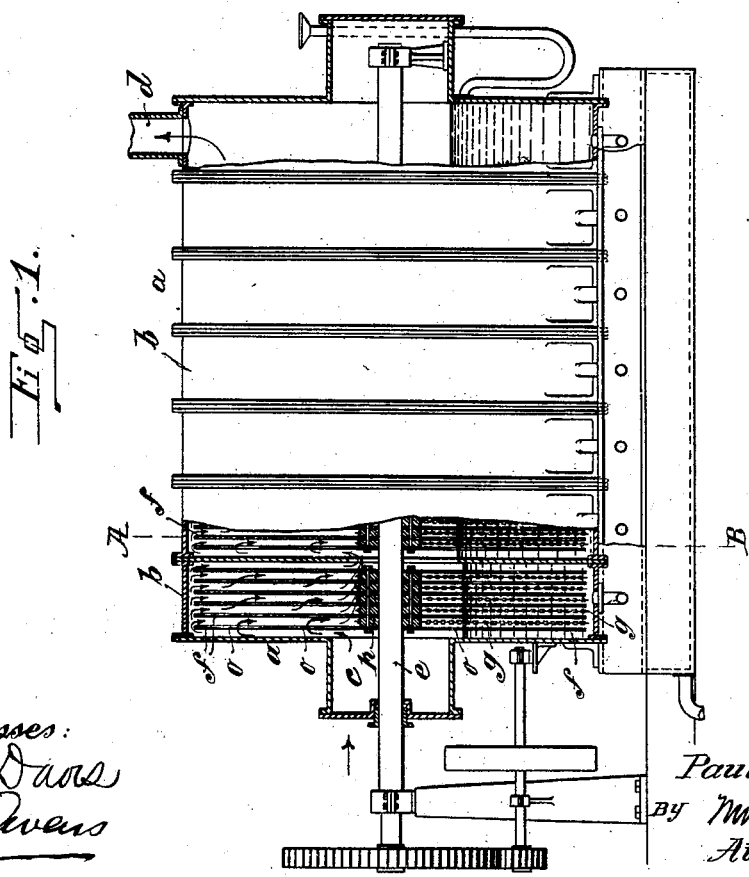
Witnesses:
Inventor
Paul Riecke
By Attorneys

UNITED STATES PATENT OFFICE.

PAUL RIECKE, OF DESSAU, GERMANY.

GAS-WASHER.

SPECIFICATION forming part of Letters Patent No. 701,619, dated June 3, 1902.

Application filed November 4, 1901. Serial No. 81,103. (No model.)

*To all whom it may concern:*

Be it known that I, PAUL RIECKE, a subject of the German Emperor, and a resident of Dessau, in the Duchy of Anhalt, German Empire, have invented certain new and useful Improvements in Gas-Washers, of which the following is a full, clear, and exact description.

The present invention relates to that class of gas-washers known as "standard" washers, in which several wheels or disks are arranged on a common shaft revolving in a cylindrical casing, the lower part of which contains the washing liquid.

The object of the invention is, on the one hand, to get a maximum amount of washing-surface in a minimum amount of room, while leaving a perfectly free passage for the gas, and, on the other hand, to clean the washing-surfaces while the apparatus is working. In this way the formation of sediment or deposit which sticks to the disks and blocks the gas passages or openings is prevented.

I will now describe my invention with reference to the accompanying drawings, in which—

Figure 1 is an elevation of the gas-washer, partly in section. Fig. 2 is a vertical cross-section of the gas-washer on line A B of Fig. 1. Fig. 3 is a detail view of the gas-washer.

The gas-tight casing $a$ of the gas-washer consists of several compartments $b$ and is filled in its lower part with the washing liquid. The gas to be washed enters the chamber $c$ at the left side of the washer, passes the single compartments $b$, and leaves the washer through the outlet $d$ at the right-side end of the washer. Within the casing $a$ rotates a revoluble shaft $e$, which can be driven as desired. Mounted on the said shaft $e$, more or less adjacent to each other, are disks $f$, having openings $o$, through which the gas passes. These disks $f$ when rotating take a part of the washing liquid with them and bring it into contact with the gas entering through the center of the chamber $c$ into the casing $a$. The gas impinges on the different disks $f$ in the direction of the arrows, Fig. 1, and passes out finally through the tube or outlet $d$.

In order to clean the disks $f$ automatically, chains $g$ are arranged between them, Fig. 1, which are suspended on the hub $h$ of the shaft $e$ and preferably so as to reach around the circumference of the disks $f$. Instead of said chains $g$ radially-arranged staves $i$ can also be used, as shown in Fig. 3, or any other equivalent means.

By means of the chains $g$ or staves $i$ lying between the side surfaces of the disks $f$ any narrowing of the space between the disks and the formation of sediment on the latter or blocking of the gas-holes is effectively prevented, so that the gas can pass through the washer without any objectionable hindrance.

What I desire to secure by Letters Patent is—

1. A gas-washer, comprising an exterior casing, vertical partitions therein forming compartments communicating with each other adjacent to the center of the casing, a rotary shaft extending centrally through the casing, perforated disks fastened to the shaft in each of said compartments, for the purpose specified, and agitator-chains hung loosely over the shaft between the disks.

2. A gas-washer, comprising an exterior casing, vertical partitions therein forming compartments communicating with each other adjacent to the center of the casing, a rotary shaft extending through the casing, perforated disks fastened to the shaft in each of said compartments, for the purpose specified, and agitator devices hung loosely from the shaft between the disks.

3. A gas-washer, comprising a casing having a gas-inlet and a gas-outlet respectively at its end portions, a rotary shaft running through the casing, disks fastened to the shaft and turning therewith to retard the passage of the gas, and agitator devices hung loosely from the shaft between the disks, whereby to clean the disks as they turn.

In testimony whereof I have signed my name to this specification, this 16th day of October, 1901, in the presence of two subscribing witnesses.

PAUL RIECKE.

Witnesses:
   CHARLES L. SIMPLE,
   CARL SCHMITT.